US012064854B2

(12) United States Patent
Ji

(10) Patent No.: US 12,064,854 B2
(45) Date of Patent: Aug. 20, 2024

(54) NAILING UNIT AND NAIL GUN COMPRISING SAID NAILING UNIT

(71) Applicant: HANGZHOU XINXING OPTICAL ELECTRONICS CO., LTD., Hangzhou (CN)

(72) Inventor: Shian Ji, Hangzhou (CN)

(73) Assignee: HANGZHOU XINXING OPTICAL ELECTRONICS CO., LTD., Hangzhou (CN)

( * ) Notice: Subject to any disclaimer, the term of this patent is extended or adjusted under 35 U.S.C. 154(b) by 0 days.

(21) Appl. No.: 17/318,397

(22) Filed: May 12, 2021

(65) Prior Publication Data

US 2021/0354275 A1 Nov. 18, 2021

(30) Foreign Application Priority Data

May 12, 2020 (CN) ......................... 202020782364.0

(51) Int. Cl.
*B25C 1/00* (2006.01)
*B25C 5/16* (2006.01)

(52) U.S. Cl.
CPC ............ *B25C 1/005* (2013.01); *B25C 5/1637* (2013.01)

(58) Field of Classification Search
CPC ......... B25C 1/005; B25C 5/1637; B25C 5/06; B25C 5/15; B25C 5/161
See application file for complete search history.

(56) References Cited

U.S. PATENT DOCUMENTS 4,230,249 A * 10/1980 Nasiatka ................... B25C 5/06 227/123
4,380,312 A * 4/1983 Landrus .................... B25C 5/06 227/139
5,150,826 A * 9/1992 Logtens .................. B25C 5/085 227/120
5,273,199 A * 12/1993 Logtens .................. B25C 5/085 227/87
5,735,444 A * 4/1998 Wingert .............. F16B 15/0015 227/119
5,931,364 A * 8/1999 Dennis ...................... B25C 7/00 227/120
7,044,351 B2 * 5/2006 Ronconi ................... B25C 5/06 227/123
7,048,169 B2 * 5/2006 Sun ....................... B25C 5/1651 227/119
7,617,958 B2 * 11/2009 Pozzato ................ B25C 5/1658 227/107

(Continued)

*Primary Examiner* — Thanh K Truong
*Assistant Examiner* — Katie L Gerth
(74) *Attorney, Agent, or Firm* — Muncy, Geissler, Olds & Lowe, P.C.

(57) ABSTRACT

A nailing unit includes a nail box, a nail magazine, a nail pushing block, a tail buckle switch, a nail limiting block fit together with a nail guiding plate through slits is provided. The nail magazine includes a heat-treated guide rail assembly mounted with a nail splitting plate at the end near the nail guiding plate. The nail pushing block connected to a spring is formed with three nail pushing feet adapted to a first, second, and third gaps. The nail guiding plate includes two connecting wings and forms a low-lying guide plate therebetween. Each angle between the guide plate and each connecting wing is respectively fixedly provided with a positioning step along the longitudinal direction.

10 Claims, 16 Drawing Sheets

(56) References Cited

U.S. PATENT DOCUMENTS

| | | | | |
|---|---|---|---|---|
| 7,770,771 | B2 * | 8/2010 | Tsai | B25C 5/1658 227/139 |
| 8,939,340 | B2 * | 1/2015 | Gardner | F16L 3/04 227/130 |
| 10,150,208 | B2 * | 12/2018 | Lin | B25C 1/184 |
| 10,307,902 | B2 * | 6/2019 | Wang | B25C 5/11 |
| 10,814,465 | B2 * | 10/2020 | Pelletier | B25C 1/008 |
| 11,007,630 | B2 * | 5/2021 | Wang | B25C 5/0292 |
| 11,090,793 | B2 * | 8/2021 | Ji | B25C 5/1651 |
| 11,090,794 | B2 * | 8/2021 | Fairbanks | B25C 7/00 |
| 11,141,849 | B2 * | 10/2021 | Ferris | B25C 1/06 |
| 2006/0231583 | A1 * | 10/2006 | Kumayama | B25C 5/1603 227/134 |
| 2007/0039575 | A1 * | 2/2007 | Sailer | F01L 1/14 123/90.48 |
| 2008/0296340 | A1 * | 12/2008 | Wang | B25C 5/1651 227/109 |
| 2011/0180583 | A1 * | 7/2011 | Wang | B25C 5/1644 227/120 |
| 2012/0043366 | A1 * | 2/2012 | Wang | B25C 5/1637 227/139 |
| 2012/0286018 | A1 * | 11/2012 | Wang | B25C 5/11 227/139 |
| 2013/0221055 | A1 * | 8/2013 | Huang | B25C 5/11 227/109 |
| 2013/0221056 | A1 * | 8/2013 | Chen | B25C 5/1644 227/120 |
| 2017/0266799 | A1 * | 9/2017 | Wang | B25C 5/1668 |
| 2018/0093370 | A1 * | 4/2018 | Yip | B25C 1/005 |
| 2019/0039223 | A1 * | 2/2019 | Wang | B25C 5/0285 |
| 2019/0077001 | A1 * | 3/2019 | Wang | B25C 5/11 |
| 2019/0160641 | A1 * | 5/2019 | Wang | B25C 5/0242 |
| 2019/0337134 | A1 * | 11/2019 | Wang | B25C 5/1606 |
| 2020/0078915 | A1 * | 3/2020 | Lamb, Sr. | B25C 5/06 |
| 2020/0230793 | A1 * | 7/2020 | Ji | B25C 1/005 |

* cited by examiner

NAILING UNIT AND NAIL GUN COMPRISING SAID NAILING UNIT

CROSS-REFERENCE TO RELATED APPLICATION

The present application relies on, for priority, China Patent Application No. 2020207823640 entitled "NAILING UNIT AND NAIL GUN COMPRISING SAID NAILING UNIT", filed on May 12, 2020, which is also herein incorporated by reference in its entirety.

FIELD OF THE INVENTION

The present invention relates to the field of nail gun, and more specifically relates to a nailing unit and a nail gun comprising said nailing unit.

DESCRIPTION OF THE PRIOR ART

Nail gun is a product of modern nail-shooting and fastening technology that can shoot nails. It belongs to the field of direct consolidation technology. It is an indispensable manual tool for woodworking and building construction. It has the advantages of small size, fast nailing speed, no external power supply equipment, etc., so it is widely used, which not only improves work efficiency, but also reduces decoration costs.

Though the nail gun in the prior art has the foregoing advantages, yet operators often need to replace nails of different kinds or specifications to meet the decoration requirement according to actual conditions. And at that time, the nail gun must also be changed. The frequent replacement not only reduces the working efficiency and universality, but also adds much troubles and inconvenience. Although there have also been nail guns that can drive straight nails and code nails at the same time, the existing nail guns often require manual and careful alignment or need to adjust the nailing device when changing the nails, and the operation of changing the nails is not convenient. Meanwhile, with the passage of time, the nail outlet of the existing nail gun will wear out, which will lead to the nail jam.

In an effort to overcome the above problems, an improved nailing unit is proposed.

SUMMARY OF THE INVENTION

Accordingly, the present invention has been keeping in mind the above problems occurring in the prior art, and the object of the present invention is to provide a nailing unit and a nail gun comprising said nailing unit that own advantages of simple structure, reasonable design and wide applicability.

The technical solution of the present invention is as follows:

A nailing unit comprising a nail box, a nail magazine arranged inside the nail box, a nail pushing block, a tail buckle switch arranged at the tail of the nail box, a nail limiting block and a nail guiding plate fit together and arranged at the front of the nail magazine, wherein the nail pushing block is slidably connected to the nail magazine; the nail magazine includes a heat-treated guide rail assembly mounted with a nail splitting plate at the end near the nail guiding plate, the nail splitting plate and the nail guiding plate form a nail outlet when the nail magazine is closed. A tension spring is installed inside the guide rail assembly and connected to the nail pushing board; the guide rail assembly comprises a guide rail bottom plate, a guide rail plate and a guide rail arranged above the guide rail bottom plate. the end near the nail guiding plate of the guide rail is provided with a heat-treated connecting piece, and said tension spring is provided in the guide rail. A first gap is formed between the guide rail plate and the inner side wall of the adjacent nail box, a second gap is formed between the guide rail plate and the guide rail, and a third gap is formed between the guide rail and the inner side wall of the adjacent nail box.

The nail pushing block is formed with three nail pushing feet adapted to the first, second, and third gaps.

The nail guiding plate includes two connecting wings, and a low-lying guide plate is formed between the two connecting wings; each angle between the guide plate and each connecting wing is respectively fixedly provided with a positioning step along the longitudinal direction.

Preferably, the tail buckle switch includes a locking seat fixed at the end of the nail box, the locking seat is formed with a pressing plate formed thereon a hook. Responsively, the gun housing is provided with a positioning slot for matching the hook. The hook is snap-in connected to the hook slot to lock the nail magazine in the nail box.

Preferably, at least one slits are provided on the nail guiding plate, the nail limiting block is inserted in the at least one slits, and the back of the nail limiting block is provided with a spring.

Preferably, the back of the nail splitting plate abuts against the end of the guide rail, and the nail splitting plate is formed with two armhole portions, and the armhole portions are formed with inclined surfaces towards the shoulder of the nail splitting plate on the side facing the nail outlet.

Preferably, an inner concave arc-shaped notch is formed in the middle of the bottom of the nail splitting plate, and correspondingly, an inner notch corresponding to the inner concave arc-shaped opening is formed at the bottom of the guide plate.

Preferably, the nail limiting block includes an adjustment plate, and guide blocks vertically fixed on both sides of the adjustment plate. The guide blocks are movably assembled in the positioning grooves, and at least one guide block has an arc-shaped surface formed on the top.

Preferably, an inner groove is formed on the outer side of the adjusting plate, a positioning column is fixed in the inner groove, a spring is sleeved on the positioning column, and the end of the spring abuts against the inner groove.

Preferably, the connecting wing is provided with a positioning notch for assembling T-shaped nails at a position close to the positioning step. Correspondingly, a step inclined surface corresponding to the positioning notch is formed on the guide block.

Preferably, the inner edge of the guide plate of the nail guiding plate forms a slightly convex semicircle.

A nail gun comprising said nailing unit, a gun housing with a cavity structure, a striker for striking the nail at the position of the nail outlet, a driving device that controls the reciprocating movement of the striker, and a switch assembly that controls the opening and closing of the driving device; the striker and the driving device are both located in the housing; the driving device includes a cylinder body fixed in the housing and a piston located in the cylinder body, the piston is slidably connected with the cylinder body, and the striker is fixedly connected with the piston.

As a preferred solution of the present invention, the nail gun further includes a positioning structure, the positioning mechanism is arranged at the front end of the nailing device, and the positioning mechanism includes a trigger protection sheet, a trigger protection switch, and a positioning block.

The upper end of the trigger protection sheet is sleeved with a spring, the top end of the trigger protection sheet abuts against the trigger protection switch, the end of the trigger protection sheet not sleeved with the spring extends out of the outer end of the gun body, and the trigger protection sheet passes through the spring and the trigger The protective sheet performs reciprocating motion; the driving device includes a cylinder body fixed in the gun body and a piston located in the cylinder body, the piston is slidably connected with the cylinder body, and the nail punching piece is fixedly connected to the piston.

The present invention has the following advantages:

1. The present invention provides a nailing unit and a nail gun comprising such nailing unit. Through the unique design of the nail guiding plate, the nail box, and the nail pushing device, fulfills the effect of one gun with multiple functions; whether it is for T nails, straight nails, or different types of code nails and U nails, all can be easily assembled, pushed steadily, and nailed accurately. The worker does not need to buy different types of nail guns to meet operational needs, reducing the costs, and it is highly optimized for general use and easy to use.

2. As the guide rail components, connecting pieces, nail splitting plate and other parts have been heat treated, and because the positioning piece is set, the hardness and rigidity of the components around the nail outlet can be improved. During use, the components around the nail outlet can be prevented from being damaged due to long-term friction and force, which will affect the nails from being hit smoothly, thereby prolonging the service life of the nail gun.

3. When the present invention is used, unlocking the nail magazine and pulling it outwards, the worker could put various types of nail rows into the grooves of the nail box without careful manual positioning, as the concave-convex structure in the nail box can instantly realize the nail row precise positioning; sliding the nail box inward to surround the nail row, and sealing the nail box through the tail buckle switch, the nail installing or nail changing operation is finished. The worker only needs to replace different types of nails in the nail box according to the actual needs, therefore the working efficiency is improved.

Figure 1:
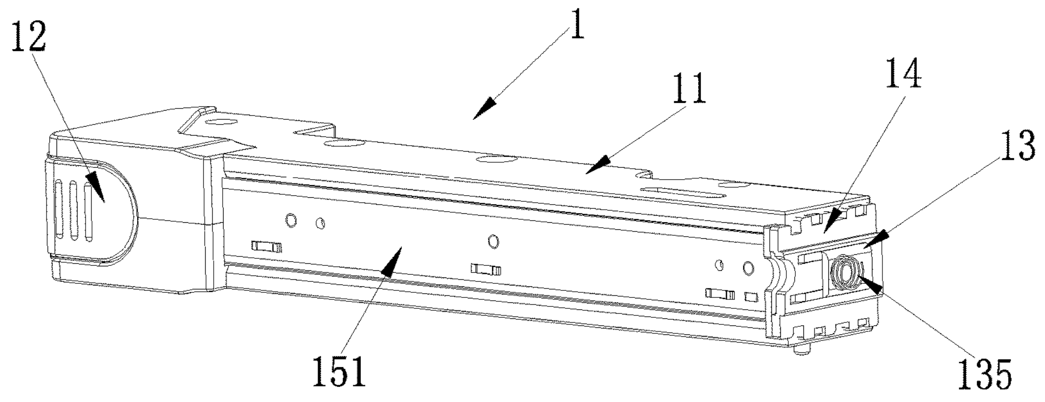
FIG. 1 is a schematic diagram of a three-dimensional structure of the nailing unit in the present invention.
Figure 2:
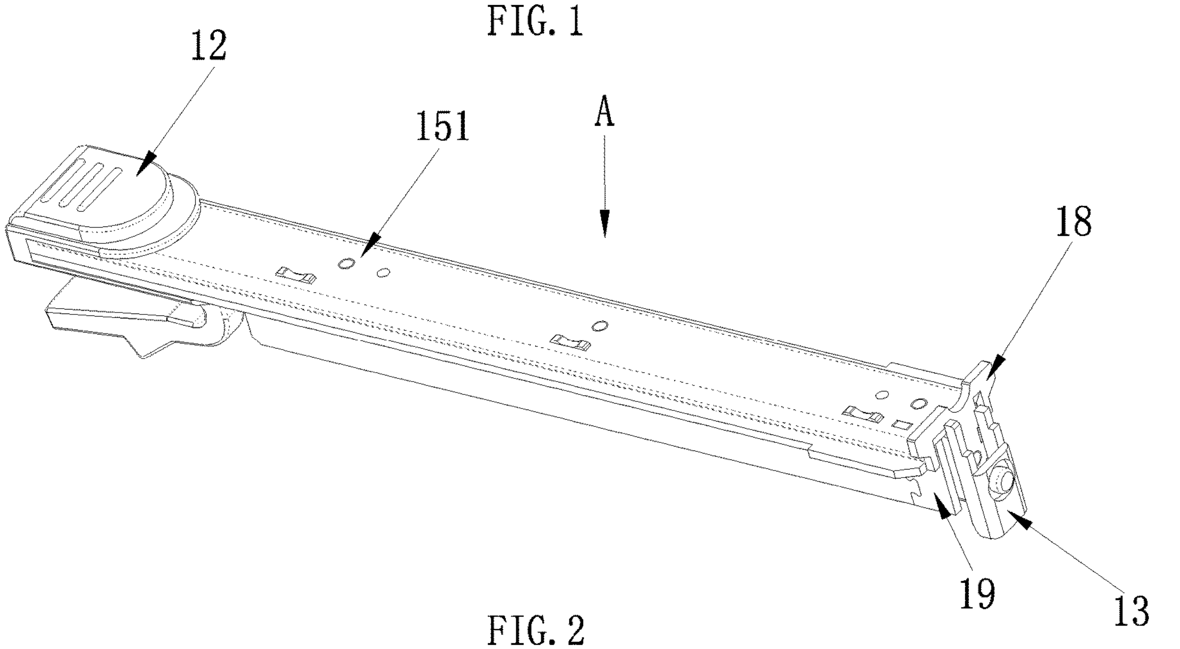
FIG. 2 is a schematic diagram of a first internal three-dimensional structure of the nailing unit in the present invention.
Figure 3:
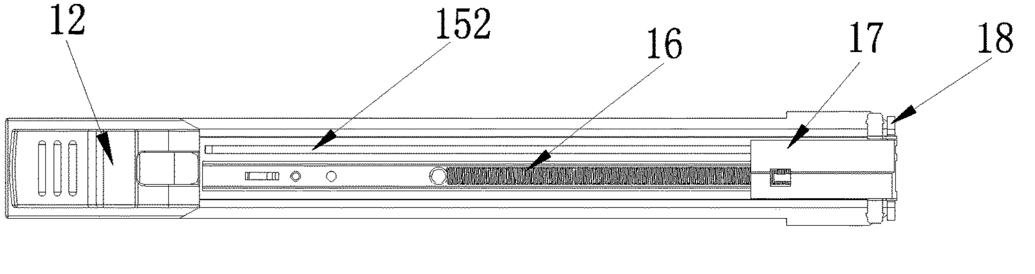
FIG. 3 is a schematic plan view of the A direction in FIG. 2.
Figure 4:
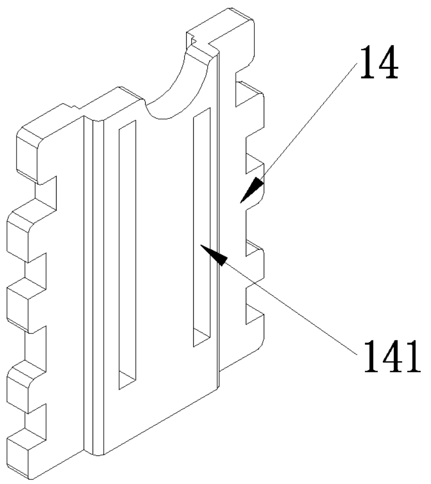
FIG. 4 is a schematic diagram of the three-dimensional structure of a nail guiding plate in the present invention.

Reference signs in the figures: nailing unit 1; nail box 11; nail magazine 111; tail buckle switch 12; locking seat 121; pressing portion 122; hook 123; nail limiting block 13; guide block 131; stepped slope 1311; arc-shaped surface 1312; adjustment board 132; concave groove 133; positioning column 134; spring 135; nail guiding plate 14; slits 141; nail outlet 1418; guide plate 142; positioning step 143; connection wing 144; positioning notch 145; concave notch 146; convex semicircle 147; guide rail bottom plate 151; guide rail plate 152; guide rail 153; first gap 1521; second gap 1522; third gap 1531; tension spring 16; nail pushing block 17; nail pushing feet 171; nail splitting plate 18; inclined surface 181; concave arc-shaped notch 182; connecting piece 19; gun housing 2; left side plate 20-1; left bottom plate 20-2; left inner concave block 20-3; left adjustment plate 20-4; right housing 21; right side plate 21-1; right bottom plate 21-2; right inner concave block 21-3; right inclined plate 21-4; sliding groove 22; mounting groove 23; positioning piece 24; nail striker 3; cylinder body 4; piston 5; trigger protection piece 61; safety frame 611; trigger protection switch 62; positioning block 63; straight nail 100; T-shaped nail 200; top 201; U-shaped nail 300; thick code nail 130; thin code nail 500; narrow code nail 600.

DETAILED DESCRIPTION OF THE PREFERRED EMBODIMENTS

The present invention will be more clearly understood from the following detailed description taken in conjunction with the accompanying drawings. Obviously, the embodiments described are only parts of embodiments of the present invention. Although the preferred embodiment of the present invention has been disclosed for illustrative purposes, those skilled in the art will appreciate that all other embodiments based on the embodiments of the present invention without paying creative work fall within the basic teaching herein set forth, without departing from the scope and spirit of the invention as disclosed in the accompanying claims.

It should be noted that in the description of the present invention, unless otherwise specified and limited clearly, the terms “dispose”, “connect”, “mount” and “communicate” etc. should be understood in generalized meaning. For example, means can be connected fixedly, detachably, or integrally, mechanically or electrically, directly or indirectly via a media, or even internally in two members. Those skilled in the art can understand the meaning of the terms according to specific conditions.

Embodiment 1

Figure 5:
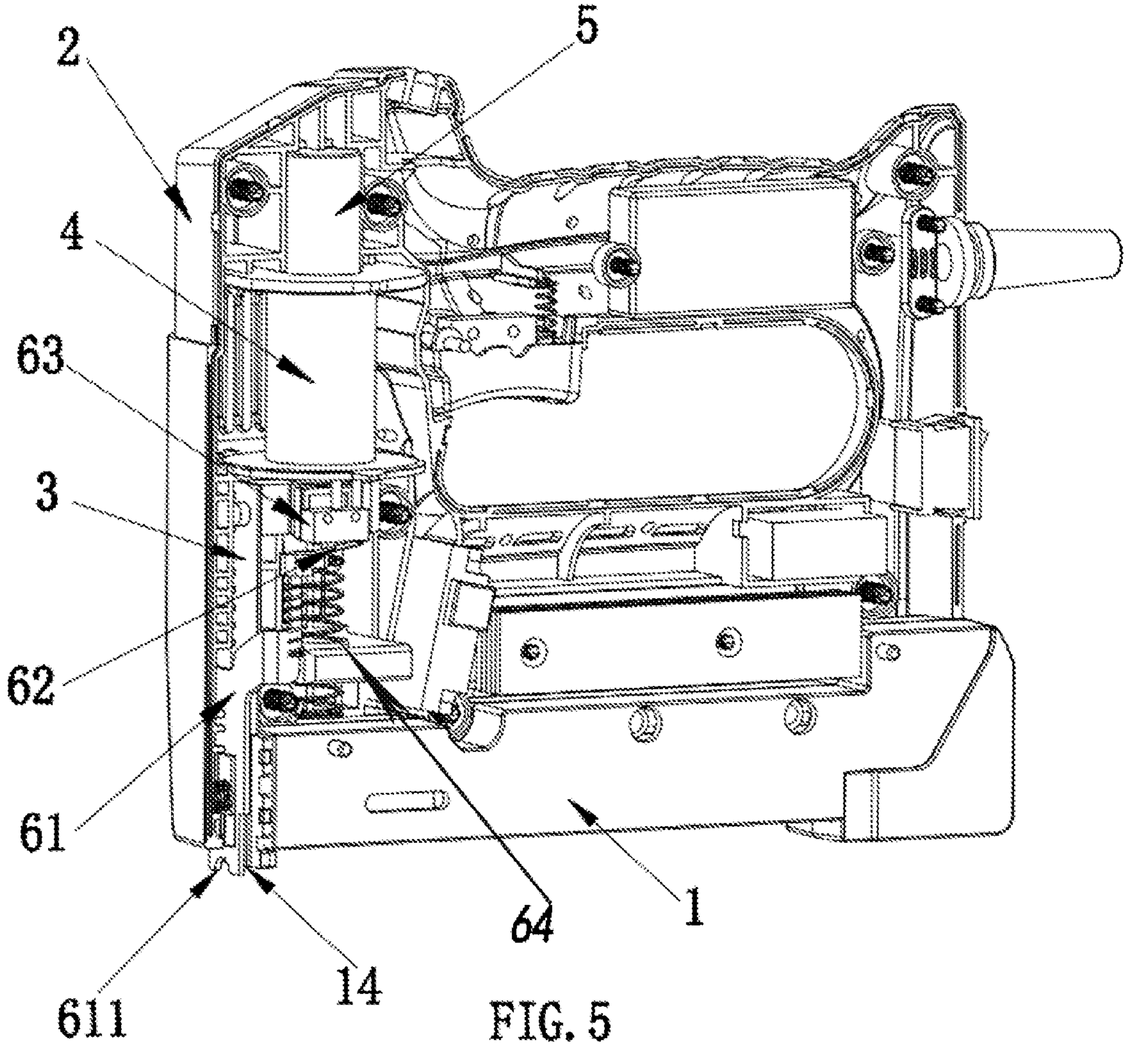
FIG. 5 is a schematic diagram of an internal three-dimensional structure of a nail gun in the present invention.
Figure 6:
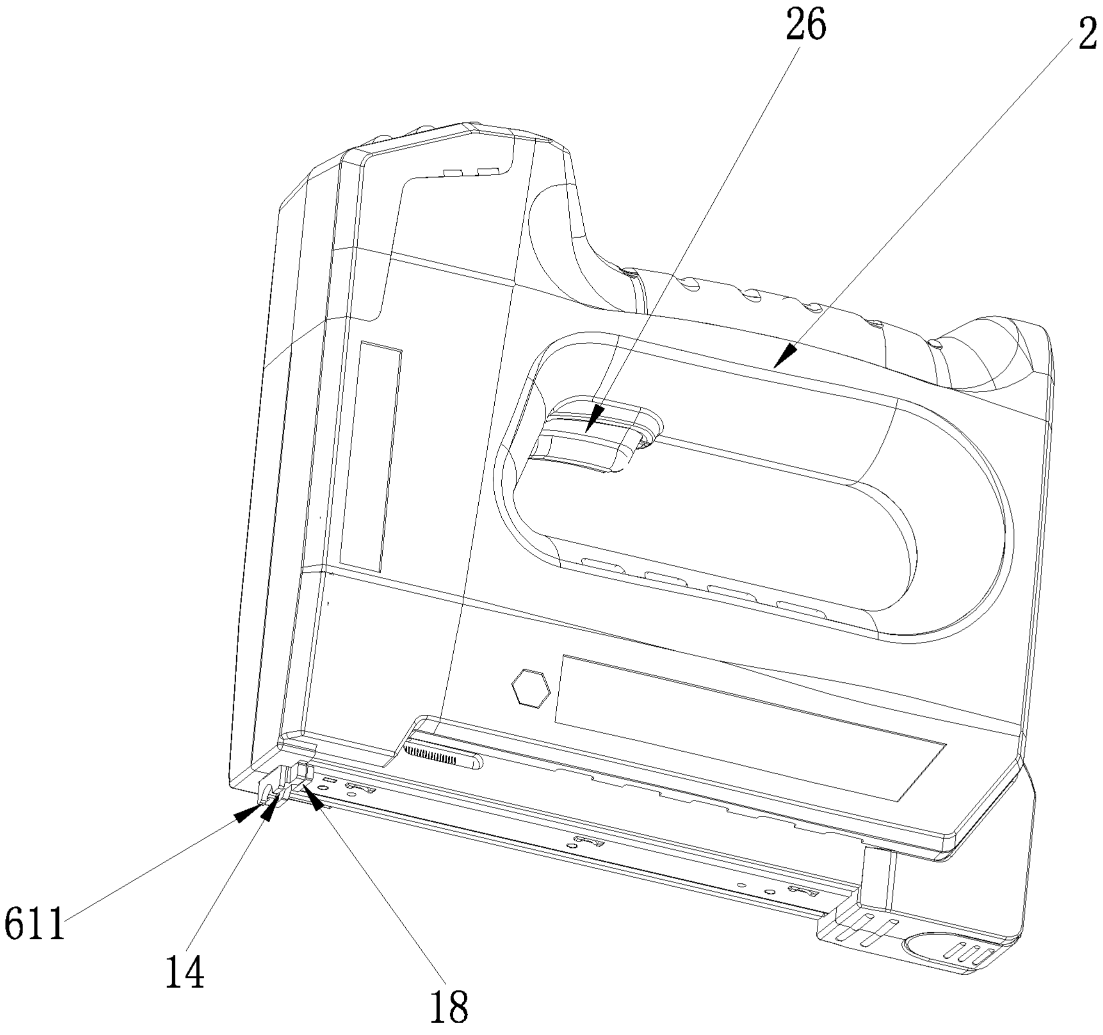
FIG. 6 is a schematic diagram of the nail gun according to the first embodiment of the present invention.
Figure 7:
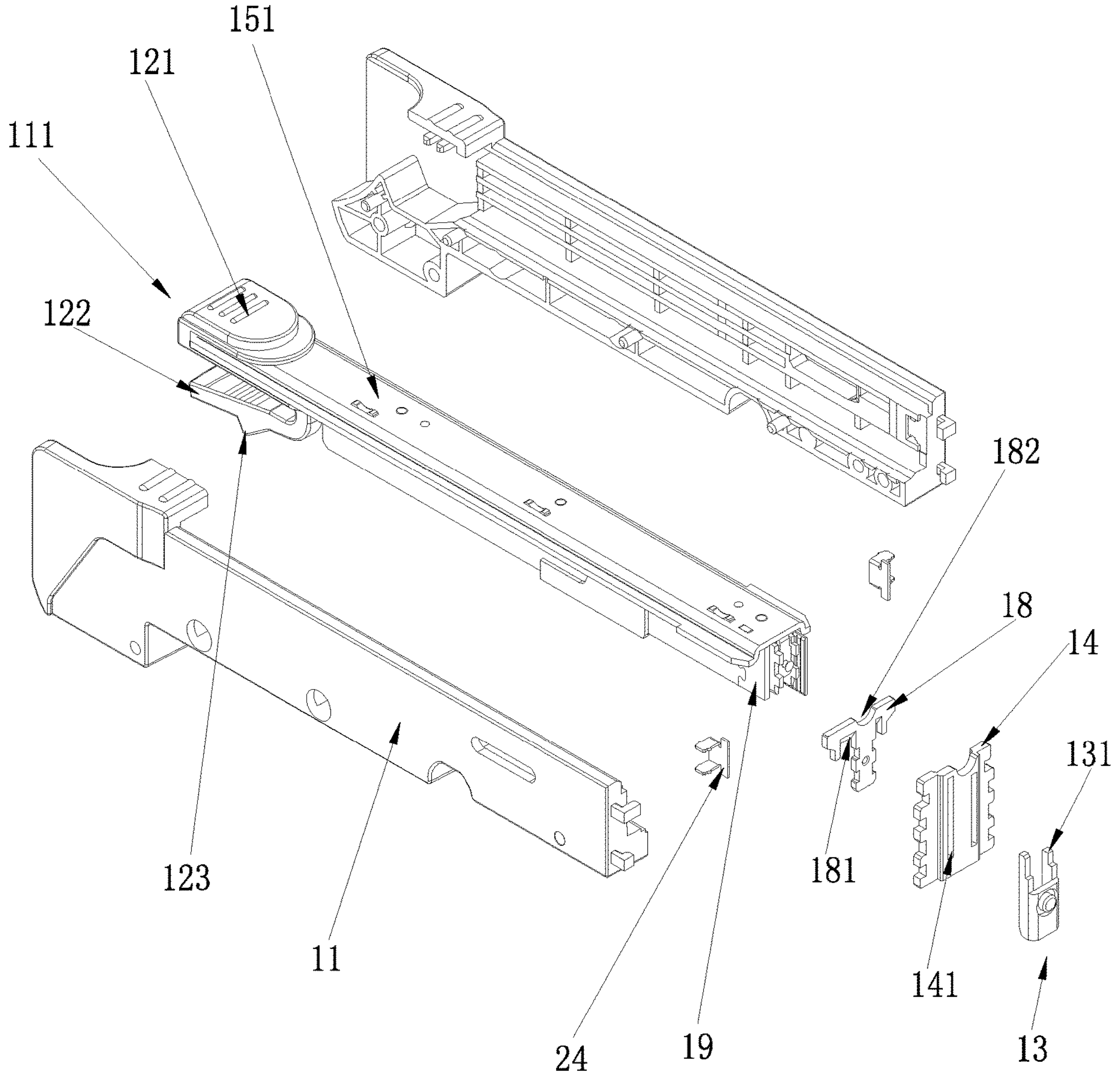
FIG. 7 is a diagram of the internal structure of a nailing unit according to the first embodiment of the present invention.
Figure 8:
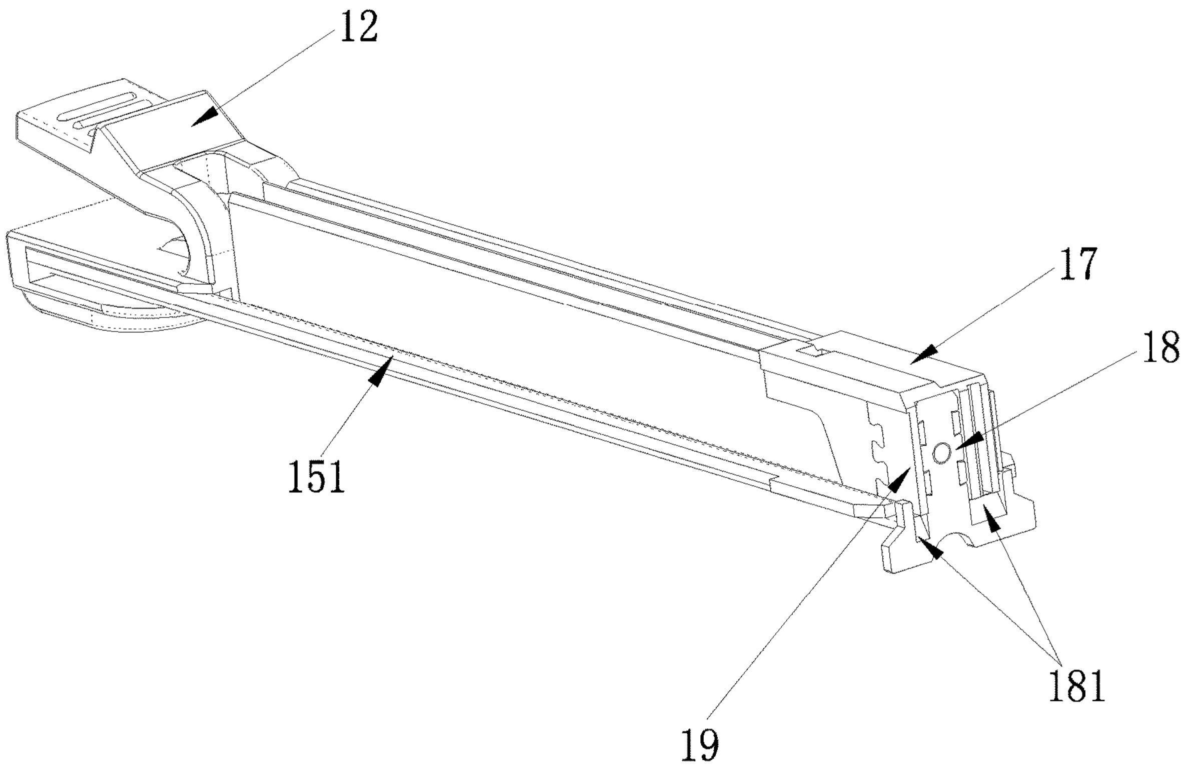
FIG. 8 is a schematic diagram of the second internal three-dimensional structure of a nailing unit in the present invention.
Figure 9:
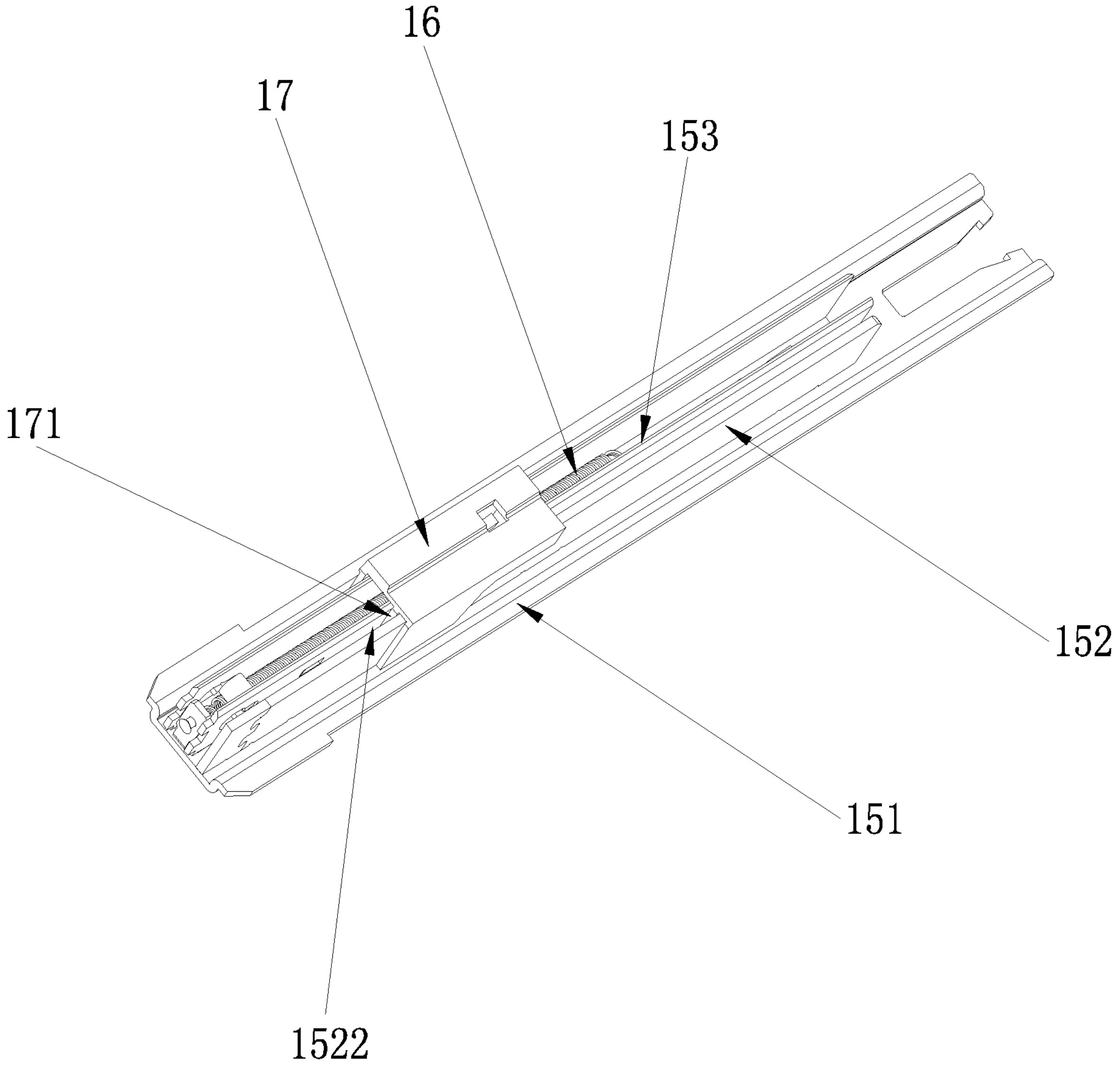
FIG. 9 is a schematic structural diagram of a nail pushing mechanism according to the first embodiment of the present invention.
Figure 10:
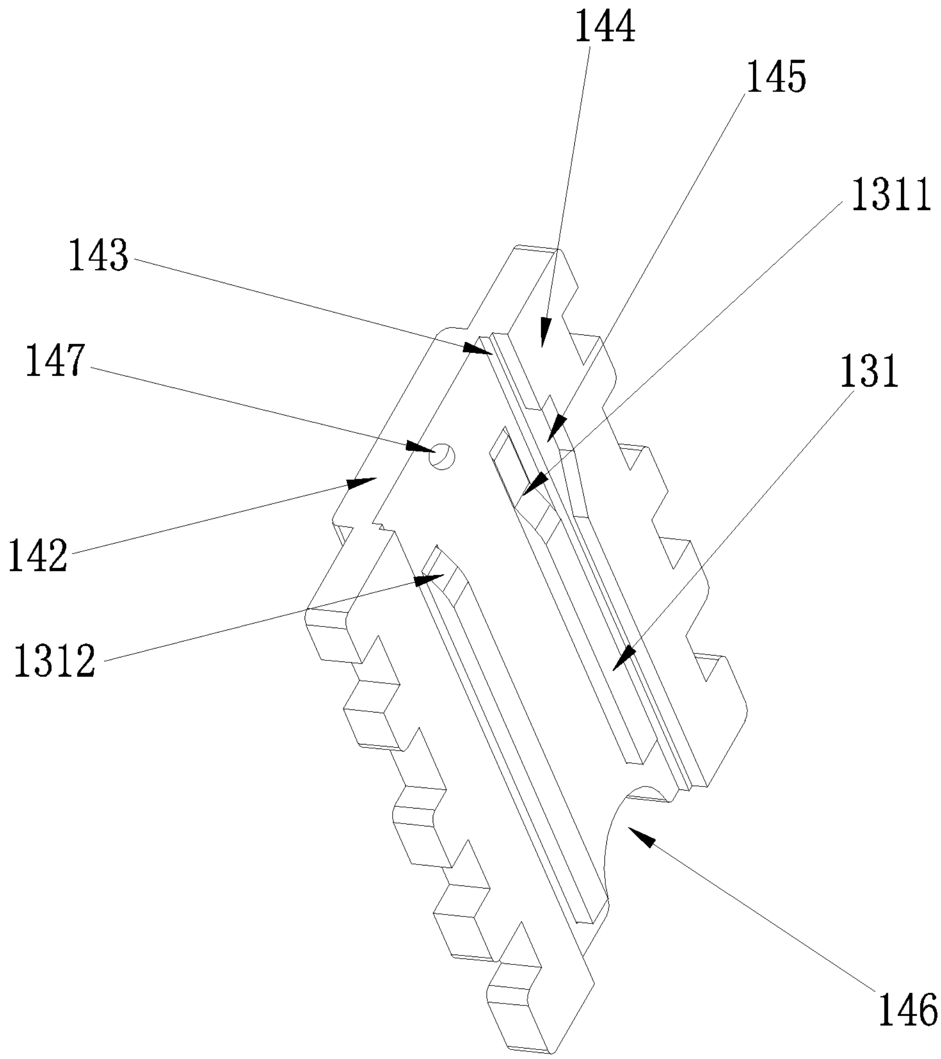
FIG. 10 is a first schematic diagram of the structural connection between a nail guiding plate and a nail limiting block according to the first embodiment of the present invention.
Figure 11:
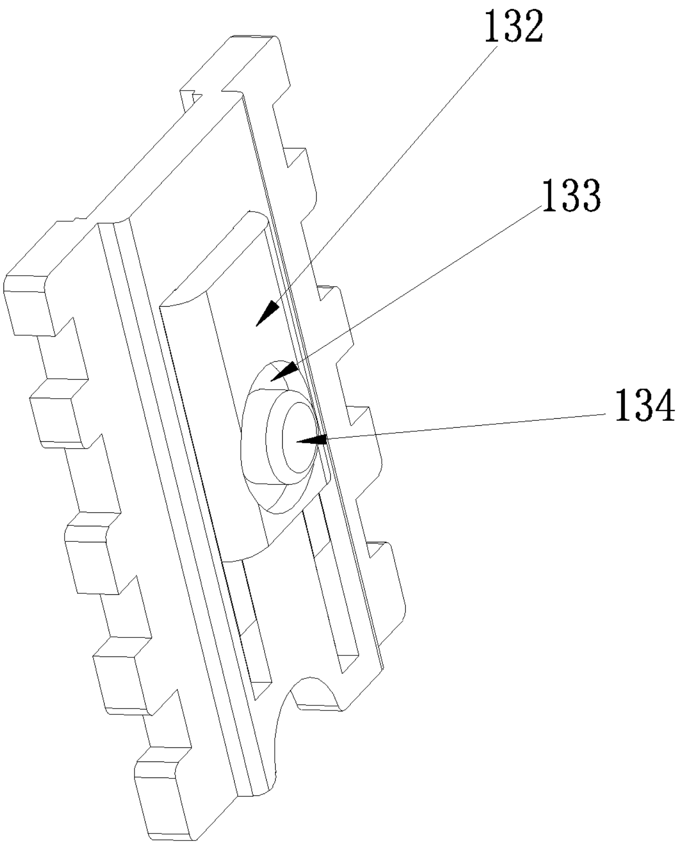
FIG. 11 is a second schematic diagram of the structural connection between the nail pushing mechanism and the nail limiting block according to the first embodiment of the present invention.

As shown in FIGS. 5-6, the nail gun, includes a nailing unit; it also includes a gun housing 2 with a cavity structure, a striker 3 for striking the nail at the position of the nail outlet 1418, a drive device for controlling the reciprocating movement of the striker 3, and a switch assembly that controls the opening and closing of the drive device; the striker 3 and the drive device are both located inside the gun housing 2; the driving device includes a cylinder body 4 fixed in the gun housing 2 and a piston 5 located in the cylinder body 4, the piston 5 is slidably connected with the cylinder body 4, and the striker 3 is fixedly connected with the piston 5.

It also includes a tail buckle switch 12 includes a locking seat 121 fixed at the end of the nail box, the locking seat is formed with a pressing plate formed thereon a hook. Responsively, the gun housing is provided with a positioning slot for matching the hook. The hook is snap-in connected to the hook slot to lock the nail magazine in the nail box.

A trigger protection piece formed with a safety frame 611 which is provided above the front end of the nail guiding plate 14 is provided. A positioning frame is formed on the trigger protection piece 61. The positioning frame is sleeved on the nail limiting block 13 and moves up and down along the nail limiting block 13. The trigger protection piece 61 is sleeved with a compression spring 64, the top of the trigger protection piece 61 is abutted with a trigger protection switch 62, the trigger protection switch 62 is connected to the Hall sensor, the Hall sensor is connected to the circuit controller, and the Hall sensor will sense the trigger protection switch 62. The signal will be transmitted to the circuit controller for the first time. At this moment, the circuit controller will immediately stop the rotation of the motor and turn the motor off. Therefore, after a nail is driven, the motor will stop immediately, even if the worker presses the trigger by mistake at this time, nailing will not occur, thereby avoiding the situation that the nail is incorrectly driven when the worker is not ready to affect the nailing quality.

When the nail gun is in normal use, press the safety frame 611 and pull the trigger, the striker 3 will strike and touch the nail, thereby pushing the nail out of the nail outlet 1418 to complete the nailing action, so once the safety frame 611 is pressed and the trigger is pressed at a time, a nailing will occur, that is, a nail can be shot. When the nail hits deep into the surface of the wood, the striker 3 will retreat to the original position. The striker 3 relies on the forward pushing of piston 5 of the cylinder body to compress the air in the cylinder body to produce high pressure to push the striker 3 to run and nail. The retraction of the striker 3 is achieved by the retraction of the piston 5 of the cylinder body to form a vacuum inside the cylinder body, thereby retrieving the striker 3 in place.

As shown in FIGS. 1-4 and 7-11, this embodiment provides a nailing unit for a nail gun comprising a nail box 11, a nail magazine 111 arranged inside the nail box 11, a nail pushing mechanism comprising a nail pushing block 17, a tail buckle switch 12 provided at the tail of the nail box, a nail limiting block 13 and a nail guiding plate 14 that are matching with each other and together provided at the front of the nail box 11. The nail pushing block 17 is in a sliding connection with the nail magazine; the nail magazine includes a heat-treated guide rail assembly, the guide rail assembly is provided with a return spring 16 connected to the nail pushing block 17; a nail outlet 1418 is formed at the connection of the nail guiding plate 14 and the nail box. The guide rail assembly includes a rail bottom plate 151, a guide rail 153 vertically fixed on the rail bottom plate 151 and a guide rail plate 152 fixed on the rail bottom plate 151 beside and parallel to the guide rail; a first gap is formed between the guide rail plate and the inner side wall of the adjacent nail box, a second gap is formed between the guide rail plate and the guide rail, and a third gap is formed between the guide rail and the inner side wall of the adjacent nail box. The nail pushing block 17 is in a slidable connection with the guide rail assembly to push the nail towards the nail outlet 1418; the nail pushing block 17 is formed with three nail pushing feet matching to the first gap, the second gap and the third gap; the three gaps are communicated with the nail outlet 1418, and are used for mounting nails of different types or specifications. The nail guiding plate includes two connecting wings, and a low-lying guide plate 142 is formed between the two connecting wings 144; each angle between the guide plate 142 and each connecting wing 144 is respectively fixedly provided with a positioning step 143 along the longitudinal direction.

The nail guiding plate provided by the present embodiment forms a slightly convex semicircle at the inner edge near the striker 13; the striker moves forward by leaning on the slightly convex semicircle, which reduces friction and increase the fluency of nail punching.

The guide rail 153 is provided with heat-treated connecting pieces 19 at the end near the nail guiding plate 14, and the guide rail is installed with a tension spring 16 therein.

The tail buckle switch 12 is fixedly set at the tail of the guide rail bottom plate 151. Two slits 141 are provided on the nail guiding plate 14, the nail limiting block 133 is inserted in the slits, and the back of the nail limiting block 133 is provided with a spring.

The nail pushing block 17 is set across the guide rail and is formed with three nail pushing feet 171 matching to the first gap 1521, the second gap 1522 and the third gap 1531. The nail pushing block 17 pushes the nails to move toward the striker 13. The first gap 1521, the second gap 1522, and the third gap 1531 are used for assembling different types and specifications of nails.

A tension spring 16 is installed in the guide rail, and the tension spring 16 is connected to the nail pushing block 17, and the nail pushing block 17 pushes the nail row to move through the rebound of the tension spring 16. A nail splitting plate 18 is installed at the front end of guide rail plate 152 and the guide rail bottom plate 151; the back of the nail splitting plate 18 abuts against the front end of the guide rail 153; the nail splitting plate is formed with two armhole portions, and the armhole portions are formed with inclined surfaces 181 towards the shoulder of the nail splitting plate on the side facing the nail outlet; and the inclined surfaces 181 are at the ends of the first gap 1521, the second gap 1522 and the third gap 1531. When the striker 3 is in a moving state, the nail at the end of the nail row in the nail magazine 111 has arrived at the nail outlet with the pushing of the nail pushing block 17, then the striker strikes the nail, and the nail is striked out smoothly along the inclined surface(s) 181. The nailing efficiency is improved and the safety in use is secured.

An inner concave arc-shaped notch 182 is formed in the middle of the bottom of the nail splitting plate 18, and correspondingly, an inner notch 146 corresponding to the inner concave arc-shaped notch 182 is formed at the bottom of the guide plate 142; The existence of the inner concave arc-shaped notch 182 and the inner notch 146 helps to accurately position the nails when installing the nails to the nail magazine 111 and also helps to accurately position the shooting point.

The guide plate 142 of the nail guiding plate is set in the front of the nail box 11 and two long slits 141 are provided in parallel on the guide plate 142, the nail limiting block 13 is in a flexible connection with the slits 141.

The nail limiting block 13 comprises an adjustment board 132, two guide blocks 131 vertically set at both sides of the adjustment board 132, the adjustment board 132 and the guide blocks 131 are fixedly connected and integrally formed, which improves the structural strength and overall firmness of the nail limiting block 13, and further ensures the safety of use. The guide blocks 131 are movably assembled in the slits 141, and the inner end of at least one guide block 131 is formed with an arc-shaped surface 1312; the arc-shaped surface 1312 abuts against the outer side of the striker 3 to guide the striker 3 to move up and down along the arc-shaped surface 1312.

A concave groove 133 is formed on the outer side of the adjustment board 132. A positioning post 134 is fixed in the concave groove 133. An abutting spring 135 is sleeved on the positioning post 134. The end of the abutting spring 135 abuts against the concave groove 133; The adjustment board is movably positioned in the slits 141, and the abutting spring 135 is used to abut the adjustment plate 132, so that the end surfaces of the guide blocks 131 are flush with the end surfaces of the connecting wings 144; the two guide blocks 131 are arranged staggered with the first gap, the second gap and the third gap; In the above technical solution, the control means uses at least one guide block 131 to selectively abut against the other surface of the nail and control the position of the adjustment plate 132.

The connecting wing 144 is provided with a positioning notch 145 for assembling T-shaped nails at a position close to the positioning step 143. Correspondingly, a stepped slope 1311 corresponding to the positioning notch 145 is formed on the adjacent guide block 131; in the above technical solution, the stepped slope 1311 and the positioning notch 145 cooperate with each other to accommodate the end of the T-shaped nail, and facilitate the punching of the striker 3 to hit the T-shaped nail.

Figure 12:
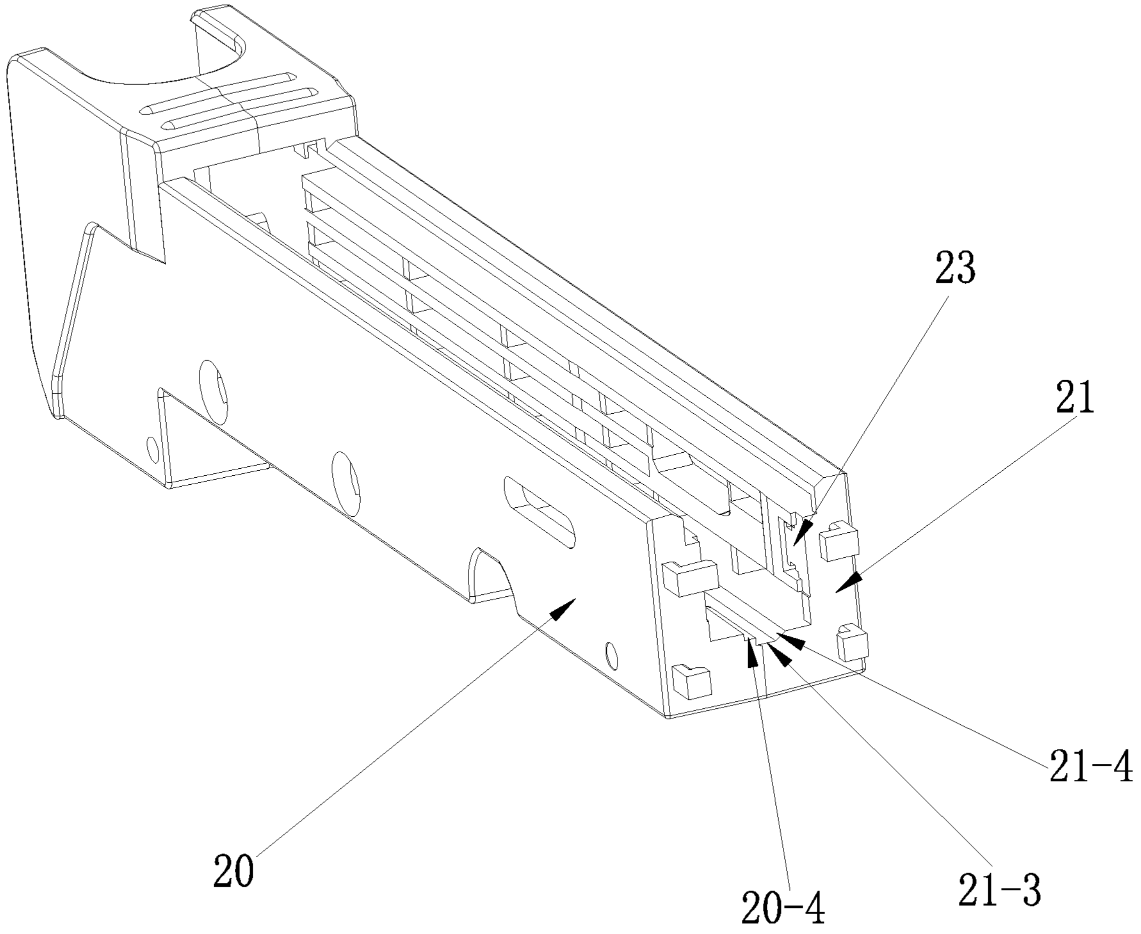
FIG. 12 is a schematic structural diagram of a nail box according to the first embodiment of the present invention.
Figure 13:
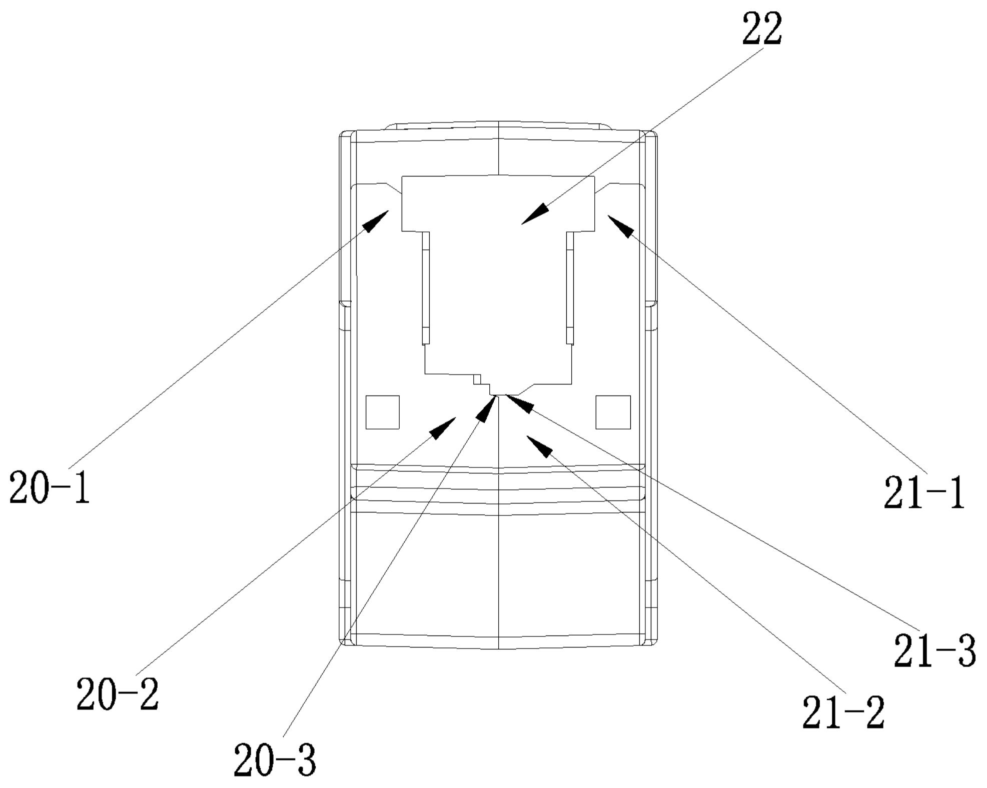
FIG. 13 is a side view of a nail box according to the first embodiment of the present invention.

As shown in FIGS. 12-13, the present embodiment provides a structural schematic diagram of the nail box 11 of the nail gun; the nail box 11 includes an L-shaped left housing 20 and a right housing 21; a sliding groove 22 is formed between the left housing 20 and the right housing, and the nail pushing board is slidably connected in the sliding groove 22; the left housing 20 includes a left bottom plate 20-2 of the left side plate 20-1, and the right housing 21 includes a right side plate 21-1 of a right bottom plate 21-2; the left bottom plate 20-2 is formed with a left inner concave block 20-3 along its length. A right inner concave block 21-3 is formed along the length direction of the right bottom plate 21-2, and a right inclined plate 21-4 is arranged between the right inner concave block 21-3 and the right bottom plate 21-2.

The left inner concave block 20-3 is provided with a left adjusting plate 20-4 near the nail outlet 4. The length of the left adjusting plate 20-4 is ⅕ to ⅒ of the length of the left inner concave block 20-3, and the left The adjusting plate 20-4 can be used to assemble the U-shaped nail with the end of the left adjusting plate 20-4 just abutting against the arc-shaped part of the U-shaped nail during the process of assembling the U-shaped nail, which further improves the efficiency and stability of the assembly of the U-shaped nail.

On the same horizontal plane, the top surface of the right bottom plate 21-2 is lower than the top surface of the left bottom plate 20-2, where the width between the left inner concave block 20-3 and the right inner concave block 21-3 is consistent to the narrower code nail so that it is convenient to locate the nails with a narrower width.

A mounting groove 23 is formed inside the left side plate 20-1 and the right side plate 21-1. The mounting groove 23 is equipped with a positioning piece 24. The upper end surface of the positioning piece 24 and the mounting groove 23 are on the same level; the positioning piece 24 and the front ends of the nail box are against each other, so that when the surrounding parts of the nail outlet of the nail gun are hit by the striker 13 in the state of nail jam or empty nail striking, with the connection points which baring the largest frictional force and easy to wear having been strengthened by the positioning piece 24, therefore, from the root cause, the wear of the nail box 11 to and the shell around the nail outlet is reduced, and the damage of the shell is avoided, thereby greatly improving the service life of the nail gun. The specific working principle is as follows: when the striker 13 is in a moving state, in a particular case, when two nails at the nail outlet cause jamming, the striker 13 will be squeezed by the nails at the nail outlet during the up and down movement, causing the striker 13 to apply additional force to the nail magazine 111, further increases the friction force between the nail box and the housing. By setting the positioning piece 24, most of the mechanical energy of the striker 13 acting on the nail outlet is obtained by the mutual friction of the nail box and the positioning piece 24 on the housing. This makes the friction work between the nail box and the housing very small when having two nails at the nail exit, which greatly reduces the wear of the nail box on the housing during the nailing process, so that the movement of the striker 13 can be used for a long time. At the same time, due to the design size and other technical requirements of the striker 13, the design space is limited. Obviously, due to a positioning piece 24 provided on the inner side of the housing near the nail outlet 4, even the nail box and the housing wear and damage in the long-term use process, the two can also maintain an effective assembly state for a long time; therefore, through the above design, the nail gun can be used for a long time, which greatly improves the service life of the nail gun.

Figure 14:
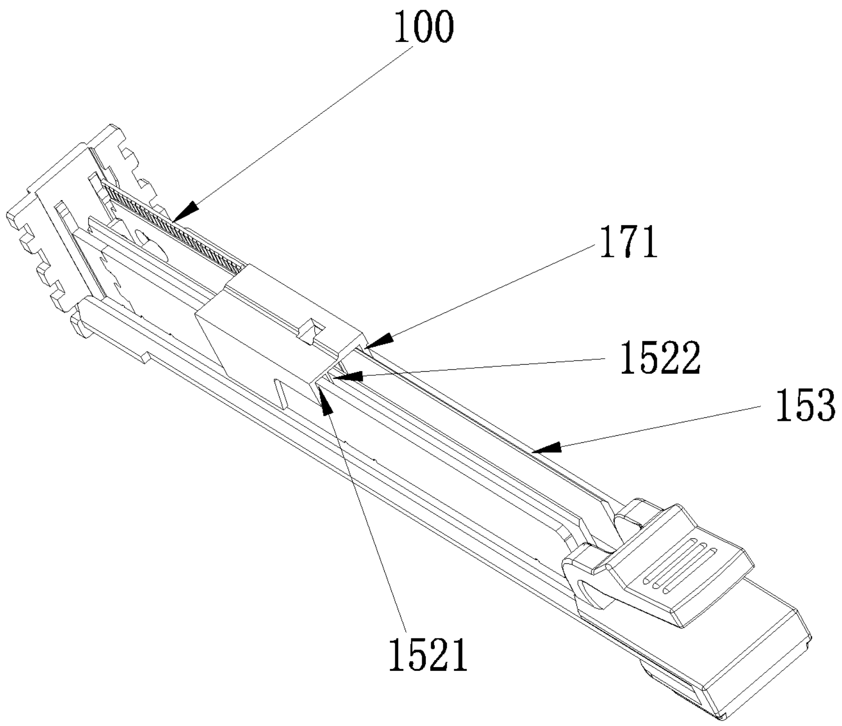
FIG. 14 is a schematic diagram of an assembly of the straight nails installed in the nail pushing mechanism according to the first embodiment of the present invention.

FIG. 14 shows the assembly diagram of the nail magazine installed with the straight nail 100 provided in this embodiment, wherein the nail splitting plate 18 is not shown in the figure in order to avoid obstructing the line of sight; in this embodiment, the straight nail 100 is assembled in the third gap 1531 in front of the nail pushing block 17; the nail tip portion of the straight nail 100 is attached to the bottom plate 151 of the guide rail, the front end of the straight nail 100 is located between the positioning step 143 and the guide block 131; one side of the straight nail 100 abuts on the inner side wall of the positioning step 143. When the nail box is sealed and buckled, the straight nail 100 on the top of the nail row emerges from the nail splitting plate 18 and is located at the nail outlet 1418 formed by the nail splitting plate 18 and the nail guiding plate 14; the punching nail piece 3 only hits the single straight nail 100 at a time, and the straight nail 100 is smoothly hit out along the inclined surface 181, and accurately nailed into the target.

Embodiment 2

Figure 15:
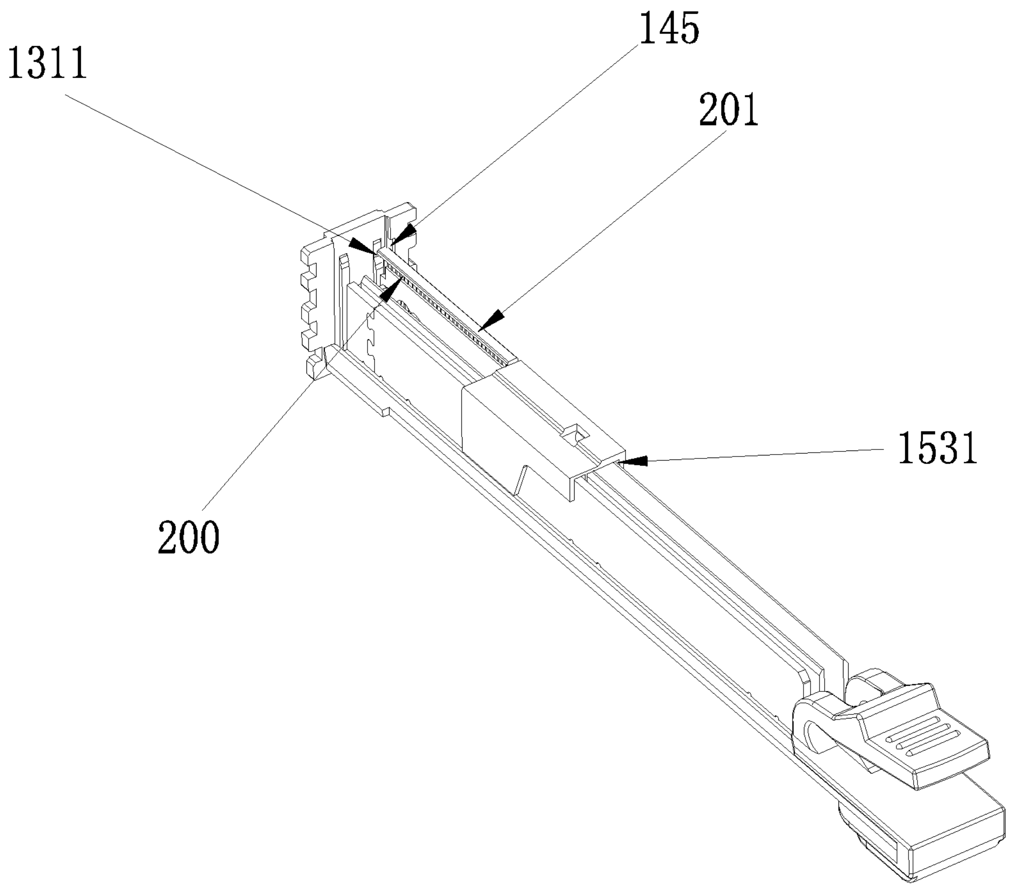
FIG. 15 is a schematic diagram of an assembly of T-shaped nails installed in the nail pushing mechanism of the second embodiment of the present invention.

As shown in FIG. 15, it is a schematic diagram of the nail magazine installed with T-shaped nails of the present invention, wherein the nail splitting plate is not shown in the figure in order not to obstruct the line of sight; in this embodiment, the T-shaped nails 200 are assembled in the third gap 1531 in front of the nail pushing block 17 in the box, the nail feet of the T-shaped nails 200 are attached to the bottom plate 151 of the guide rail, and the front end of the T-shaped nails 200 are located between the positioning step 143 and the guide block 131. When the front of the nail pushing block 17 is equipped with the T-shaped nail 200, the nail foot of the T-shaped nail 200 are located in the third gap 1531, and the top end 202 of the T-shaped nail 200 is assembled between the positioning notch 145 and the stepped slope 1311; the positioning notch 145 and the stepped slope 1311 are for the top end 201 of the T-shaped nail 200 to lean against. When the nail box is sealed and buckled, the T-shaped nail 200 on the top of the nail row emerges from the nail splitting plate 18 and is in the nail outlet 1418 formed by the nail guiding plate 14 and the nail splitting plate 18, the nail striker 3 only hits a single T-shaped nail 200 at a time, and the T-shaped nail 200 is smoothly shot out along the inclined surface 181, and the positioning notch 145 and the stepped slope 1311 can guide the T-shaped nail 200 to shoot longitudinally to nail into the target accurately.

For other contents of this embodiment, please refer to the Embodiment 1.

Embodiment 3

Figure 16:
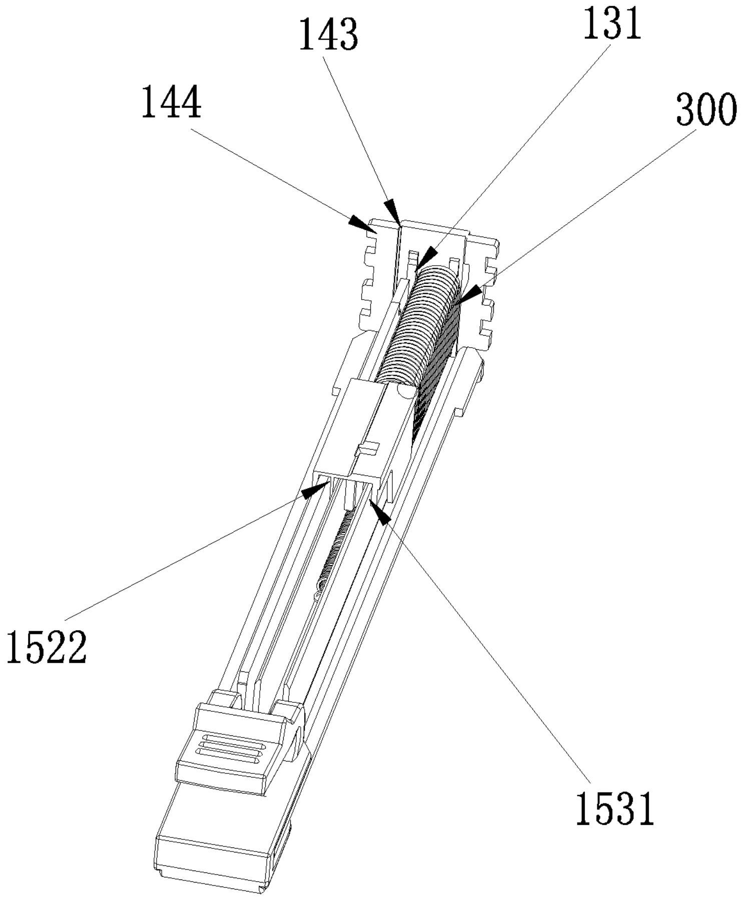
FIG. 16 is a schematic diagram of an assembly of U-shaped nails installed in the nail pushing mechanism of the third embodiment of the present invention.

As shown in FIG. 16, it is a schematic diagram of the assembly of U-shaped nails installed in the nail magazine according to the embodiment of the present invention, wherein the nail splitting plate is not shown in the figure because it blocks the line of sight. In this embodiment, the left side of the nail box housing has its one end abutting the arc part of the U-shaped nail 300, and the two nail feet of the U-shaped nail 300 are respectively assembled in the second gap 1522 and the third gap 1531 in front of the nail pushing block 17 in the nail box, further improves the assembly efficiency and assembly stability of U-shaped nails. When the nail box is sealed and buckled, the U-shaped nail 300 on the top of the nail row emerges from the nail splitting plate 18 and is located in the nail outlet 1418 formed by the nail splitting plate 18 and the nail guiding plate 14, and lateral of one foot of the staple 300 abuts on the inner side wall of the guide block 131, the lateral of the other foot abuts on the inner side wall of the positioning step 143 for positioning the U-shaped nail 300, therefore the U-shaped nail 300 is embedded against the guide plate 142; because the U The nail 300 is thick, so the nail punching piece 3 can only hit a single U-shaped nail 300 at a time, and the guide block 131 and the positioning protrusion 143 can guide the U-shaped nail 300 to be ejected longitudinally, facilitating accurate nailing into the target. For other contents of this embodiment, please refer to the first embodiment or the second embodiment.

Embodiment 4

Figure 17:
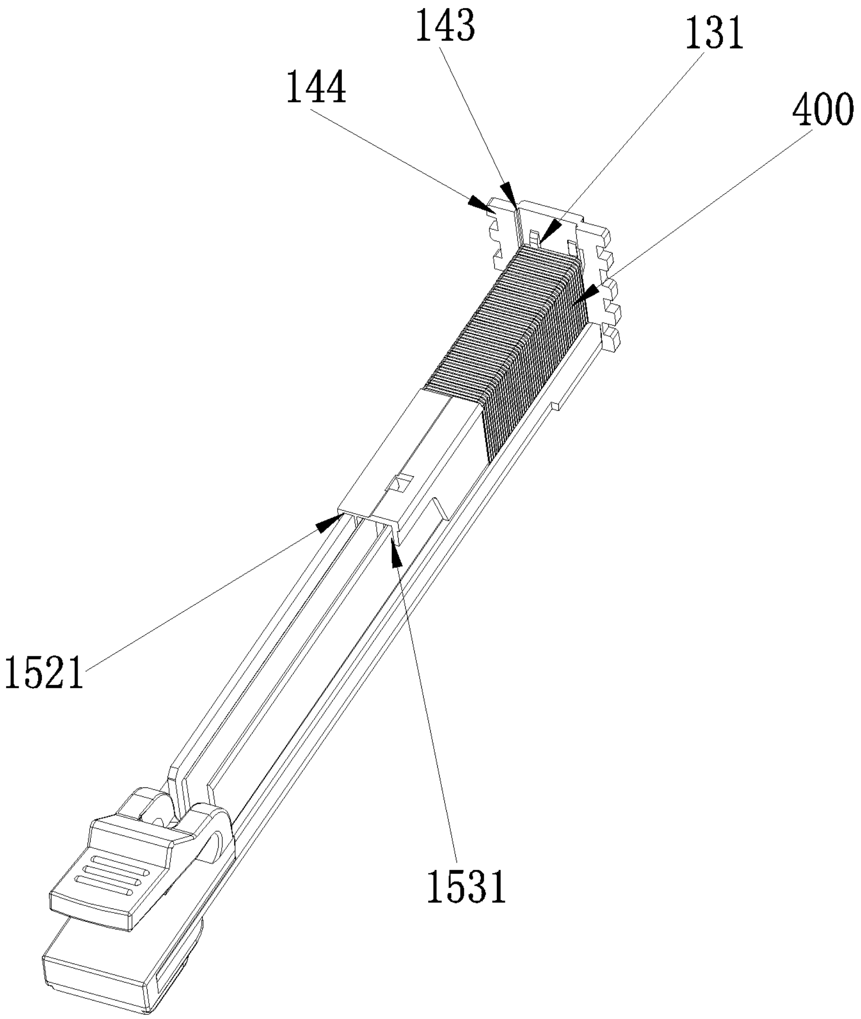
FIG. 17 is a schematic diagram of an assembly of thick code nails installed in the nail pushing mechanism of the fourth embodiment of the present invention.

As shown in FIG. 17, it is a schematic diagram of the assembly of thin code nails installed in the nail magazine according to the embodiment of the present invention, wherein the nail splitting plate is not shown in the figure in order not to obstruct the line of sight. In this embodiment, two feet of the thin code nails 400 are respectively assembled in the first gap 1521 and the third gap 1531 before the nail pushing block 17 in the nail magazine. When the nail box is sealed and buckled, the thin code nails 400 on the top of the nail row emerge from the nail splitting plate 18 and are in the nail outlet 1418 formed by the nail splitting plate 18 and the nail guiding plate 14, the two front ends of the thin code nail 400 are located in the two side walls of the connecting wings 144, so as to be accurately positioned and guided. When shooting nails, the striker 3 can only hit a single thin code nail 400 each time, which facilitates accurate nailing into the target. For other contents of this embodiment, please refer to the first embodiment, the second embodiment or the third embodiment.

Embodiment 5

Figure 18:
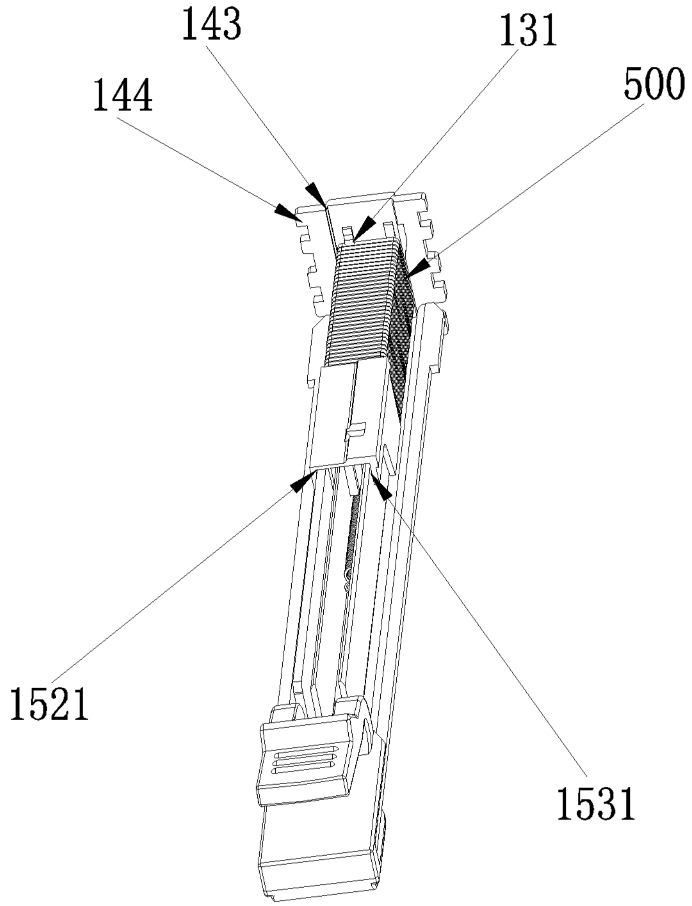
FIG. 18 is a schematic diagram of an assembly of thin code nails installed in the nail pushing mechanism of the fifth embodiment of the present invention.

As shown in FIG. 18, it is a schematic diagram of the assembly of the thick code nails installed in the nail magazine according to the embodiment of the present invention, wherein the separate nail splitting plate is not shown in the figure because in that case the line of sight will be blocked. In this embodiment, the thick code nail 500 is assembled in in the first gap 1521 and the third gap 1531 in front of the nail pushing block 17 in the nail box, when the nail box is sealed and buckled, the thick-coded nail 130500 on the top of the nail row emerges from the nail splitting plate 18 and is in the nail outlet 1418 formed by the nail guiding plate 14 and the nail splitting plate; the two sides of the front end of the thick code nail 500 are located in the inner side walls of the two positioning steps 143; the top end of the thick code nail 500 abuts on the guide block 131 to be accurately positioned and guided. For other contents of this embodiment, refer to Embodiment 1, Embodiment 2, Embodiment 3, or Embodiment 4.

Embodiment 6

Figure 19:
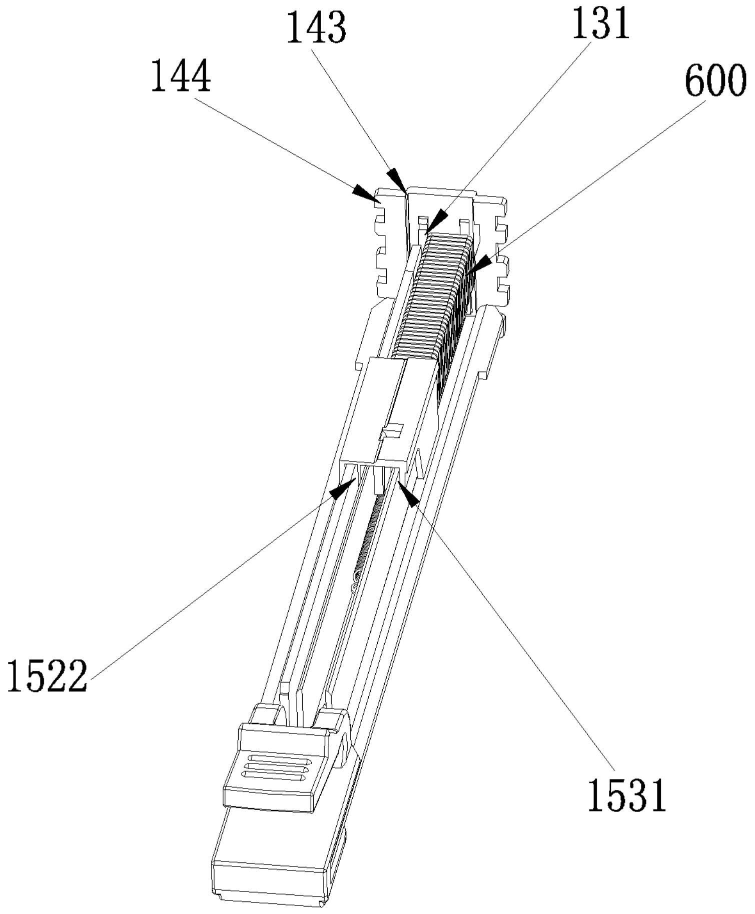
FIG. 19 is a schematic diagram of an assembly of narrow code nails installed in the nail pushing mechanism of the sixth embodiment of the present invention.

As shown in FIG. 19, it is a schematic diagram of the assembly of narrow-code nails installed in the front of the nail push block according to the embodiment of the present invention wherein the nail splitting plate is not shown in the figure because it blocks the line of sight; in this embodiment, the width between the left inner concave block 20-3 and the right inner concave block 21-3 in the nail box housing is consistent to the width of the narrow code nail 600 and, so that the narrow code nail 600 can be conveniently located. The narrow size nails 600 are assembled in the second gap 1522 and the third gap 1531 in front of the nail pushing block 17 in the nail magazine. When the nail box is sealed and buckled, the narrow code nail 600 on the top of the nail row emerges from the nail splitting plate 18 and is located in the nail outlet 1418 formed by the nail splitting plate 18 and the nail guiding plate 14; one lateral of the feet of the narrow code nail 600 abuts against the inner side wall of the guide block 131, and the other outer side of the feet abuts against the inner side wall of the positioning step 143, therefore the narrow code nail 600 is embedded against the guide plate 142 to be accurately positioned and guided. The nail punching sheet 3 can only hit a single narrow code nail 600 at a time, and the guide block 131 and the positioning protrusion 143 can guide the narrow code nail 600 to be shot longitudinally, facilitating accurate nailing into the target. For other contents of this embodiment, refer to Embodiment 1, Embodiment 2, Embodiment 3, Embodiment 4, or Embodiment 5.

The above description of published embodiments enables the persons skilled in the art to realize or use the present invention. Various modifications of these embodiments are obvious to those skilled in the art. The general principle according to the present invention can be embodied in other examples without departing from the spirit and scope of the invention as defined by the appended claims. Hence, the present invention shall not be limited to the embodiments shown in in the specification but to the widest range conforming to principles and novel features that are disclosed in this paper.

Although specific terms are employed herein, such as, nailing unit 1; nail box 11; nail magazine 111; tail buckle switch 12; locking seat 121; pressing portion 122; hook 123; nail limiting block 13; guide block 131; stepped slope 1311; arc-shaped surface 1312; adjustment board 132; concave groove 133; positioning column 134; abutting spring 135; nail guiding plate 14; slits 141; nail outlet 1418; guide plate 142; positioning step 143; connection wing 144; positioning notch 145; concave notch 146; convex semicircle 147; guide rail bottom plate 151; guide rail plate 152; guide rail 153; first gap 1521; second gap 1522; third gap 1531; tension spring 16; nail pushing plate 17; nail pushing feet 171; nail splitting plate 18; inclined surface 181; concave arc-shaped notch 182; connecting piece 19; gun housing 2; left side plate 20-1; left bottom plate 20-2; left inner concave block 20-3; left adjustment plate 20-4; right housing 21; right side plate 21-1; right bottom plate 21-2; right inner concave block 21-3; right inclined plate 21-4; sliding groove 22; mounting groove 23; positioning piece 24; nail striker 3; cylinder body 4; piston 5; trigger protection piece 61; safety frame 611; trigger protection switch 62; positioning block 63; compression spring 64; straight nail 100; T-shaped nail 200; top 201; U-shaped nail 300; thick code nail 130; thin code nail 500; narrow code nail 600 and the like, is also possible for the present invention to use other terms. The above terms are merely intended to describe and demonstrate the essence of the present invention easily and conveniently. It is a departure from the spirit of the invention to construe these terms as an additional limitation.

What is claimed is:

1. A nailing unit comprising a nail box, a nail magazine arranged inside the nail box, a nail pushing block, a tail buckle switch arranged at a tail of the nail box, a nail limiting block and a nail guiding plate fit together and arranged at a front of the nail magazine, wherein the nail pushing block is slidably connected to the nail magazine; the nail magazine includes a heat-treated guide rail assembly mounted with a nail splitting plate at an end near the nail guiding plate, the nail splitting plate and the nail guiding plate form a nail outlet when the nail magazine is closed; a tension spring is installed inside the guide rail assembly and connected to the nail pushing board; the guide rail assembly comprises a guide rail bottom plate, a guide rail plate and a guide rail arranged above the guide rail bottom plate; the end near the nail guiding plate of the guide rail is provided with a heat-treated connecting piece, and said tension spring is provided in the guide rail; a first gap is formed between the guide rail plate and an inner side wall of the adjacent nail box, a second gap is formed between the guide rail plate and the guide rail, and a third gap is formed between the guide rail and the inner side wall of the adjacent nail box; the nail pushing block is formed with three nail pushing feet adapted to the first, second, and third gaps; the nail guiding plate includes two connecting wings, and a low-lying guide plate is formed between the two connecting wings; between each right angle formed by the guide plate and each connecting wing is respectively fixedly provided with a positioning step extending along a longitudinal direction from a front end to a rear end of the guide plate; the nail limiting block includes an adjustment board, and guide blocks vertically fixed on both sides of the adjustment board; the guide blocks are movably assembled in the positioning grooves, and at least one guide block has an arc-shaped surface formed on the top; an inner groove is formed on the outer side of the adjustment board, a positioning column is fixed in the inner groove, an abutting spring is sleeved on the positioning column, and the end of the abutting spring abuts against the inner groove.

2. The nailing unit according to claim 1, wherein the tail buckle switch includes a locking seat fixed at the end of the nail box, the locking seat is formed with a pressing plate formed thereon a hook; responsively, a gun housing is provided with a positioning slot for matching the hook; the hook is snap-in connected to a hook slot to lock the nail magazine in the nail box.

3. The nailing unit according to claim 1, wherein at least one slits are provided on the nail guiding plate, the nail limiting block is inserted in the at least one slits, and the back of the nail limiting block is provided with an abutting spring.

4. The nailing unit according to claim 3, wherein a back of the nail splitting plate abuts against an end of the guide rail, and the nail splitting plate is formed with two armhole portions, and the armhole portions are formed with inclined surfaces towards a shoulder of the nail splitting plate on a side facing the nail outlet.

5. The nailing unit according to claim 4, wherein an inner concave arc-shaped notch is formed in the middle of a bottom of the nail splitting plate, and correspondingly, an inner notch corresponding to the inner concave arc-shaped opening is formed at the bottom of the guide plate.

6. The nailing unit according to claim 1, wherein the connecting wing is provided with a positioning notch for assembling T-shaped nails at a position close to the positioning step, correspondingly, a step inclined surface corresponding to the positioning notch is formed on the guide block.

7. A nail gun comprising said nailing unit according to claim 6, wherein also comprises: a gun housing with a cavity structure, a striker for striking the nail at the position of the nail outlet, a driving device that controls the reciprocating movement of the striker, and a switch assembly that controls the opening and closing of the driving device; the striker and the driving device are both located in the housing; the driving device includes a cylinder body fixed in the housing and a piston located in the cylinder body, the piston is slidably connected with the cylinder body, and the striker is fixedly connected with the piston.

8. The nail gun according to claim 7, wherein the nail gun further comprises a positioning structure, the positioning mechanism is arranged at the front end of the nailing device, and the positioning mechanism includes a trigger protection piece, a trigger protection switch, and a positioning block;

the upper end of the trigger protection piece is sleeved with a spring, the top end of the trigger protection piece abuts against the trigger protection switch, the end of the trigger protection piece not sleeved with the spring extends out of the outer end of the gun body, and the trigger protection piece passes through the spring and the trigger the protection piece performs reciprocating motion; the driving device includes a cylinder body fixed in the gun body and a piston located in the cylinder body, the piston is slidably connected with the cylinder body, and the nail punching piece is fixedly connected to the piston.

9. A nail gun comprising said nailing unit according to claim 1, wherein also comprises: a gun housing with a cavity structure, a striker for striking the nail at a position of the nail outlet, a driving device that controls the reciprocating movement of the striker, and a switch assembly that controls the opening and closing of the driving device; the striker and the driving device are both located in the housing; the driving device includes a cylinder body fixed in the housing and a piston located in the cylinder body, the piston is slidably connected with the cylinder body, and the striker is fixedly connected with the piston.

10. The nail gun according to claim 9, wherein the nail gun further comprises a positioning structure, the positioning mechanism is arranged at the front end of the nailing device, and the positioning mechanism includes a trigger protection piece, a trigger protection switch, and a positioning block; the upper end of the trigger protection piece is sleeved with a compression spring, the top end of the trigger protection piece abuts against the trigger protection switch, the end of the trigger protection piece not sleeved with the compression spring extends out of the outer end of the gun body, and the trigger protection piece passes through the compression spring and the trigger; the protection piece performs reciprocating motion; the driving device includes a cylinder body fixed in the gun body and a piston located in the cylinder body, the piston is slidably connected with the cylinder body, and the nail punching piece is fixedly connected to the piston.

* * * * *